(12) United States Patent
Rosenberg

(10) Patent No.: US 11,774,245 B1
(45) Date of Patent: Oct. 3, 2023

(54) VEHICLE HULL WITH INTERFEROMETRIC FIBER-OPTIC GYROSCOPE

(71) Applicant: Morgan D. Rosenberg, Alexandria, VA (US)

(72) Inventor: Morgan D. Rosenberg, Alexandria, VA (US)

( * ) Notice: Subject to any disclaimer, the term of this patent is extended or adjusted under 35 U.S.C. 154(b) by 0 days.

(21) Appl. No.: 18/329,609

(22) Filed: Jun. 6, 2023

(51) Int. Cl.
*G01C 19/72* (2006.01)

(52) U.S. Cl.
CPC .................................. *G01C 19/72* (2013.01)

(58) Field of Classification Search
CPC .... G01C 19/72; G01C 19/721; G01C 19/722; B63B 3/13; B63G 8/00; B63G 8/01
See application file for complete search history.

(56) References Cited

U.S. PATENT DOCUMENTS

| 5,698,848 | A * | 12/1997 | Belk | G01D 5/35383 |
| | | | | 250/227.14 |
| 7,117,813 | B2 | 10/2006 | Kellermann et al. | |
| 10,837,778 | B2 | 11/2020 | Khan et al. | |
| 2008/0018902 | A1* | 1/2008 | Truncale | G01C 19/72 |
| | | | | 356/460 |
| 2021/0331774 | A1* | 10/2021 | Lautrup | B63G 8/28 |

FOREIGN PATENT DOCUMENTS

CN 106015944 B 10/2018

OTHER PUBLICATIONS

Sanders, Glen A., et al. "Fiber optic gyros for space, marine, and aviation applications." Fiber Optic Gyros: 20th Anniversary Conference. vol. 2837. SPIE, 1996.
Heckman, Dwayne W., et al. "Improved affordability of high precision submarine inertial navigation by insertion of rapidly developing fiber optic gyro technology." IEEE 2000. Position Location and Navigation Symposium (Cat. No. 00CH37062). IEEE, 2000.

* cited by examiner

*Primary Examiner* — Michael A Lyons

(57) ABSTRACT

The vehicle hull with an interferometric fiber-optic gyroscope includes an outer hull, an inner hull arranged within the outer hull, and an interferometric fiber-optic gyroscope. A fiber optic coil of the interferometric fiber-optic gyroscope is wound around the inner hull in a space between the inner hull and the outer hull. As a non-limiting example, the vehicle may be a dual-hull submarine, and the fiber optic coil may be would around the pressure hull of the submarine within the space between the pressure hull and the light hull. The interferometric fiber-optic gyroscope also includes a light source and an optical modulator in optical communication therewith. The fiber optic coil is optically coupled at two ends thereof to the optical modulator for receiving two counter-propagating light beams therefrom. A photodetector is optically coupled with the optical modulator for receiving a recombined light beam produced by the optical modulator.

9 Claims, 5 Drawing Sheets

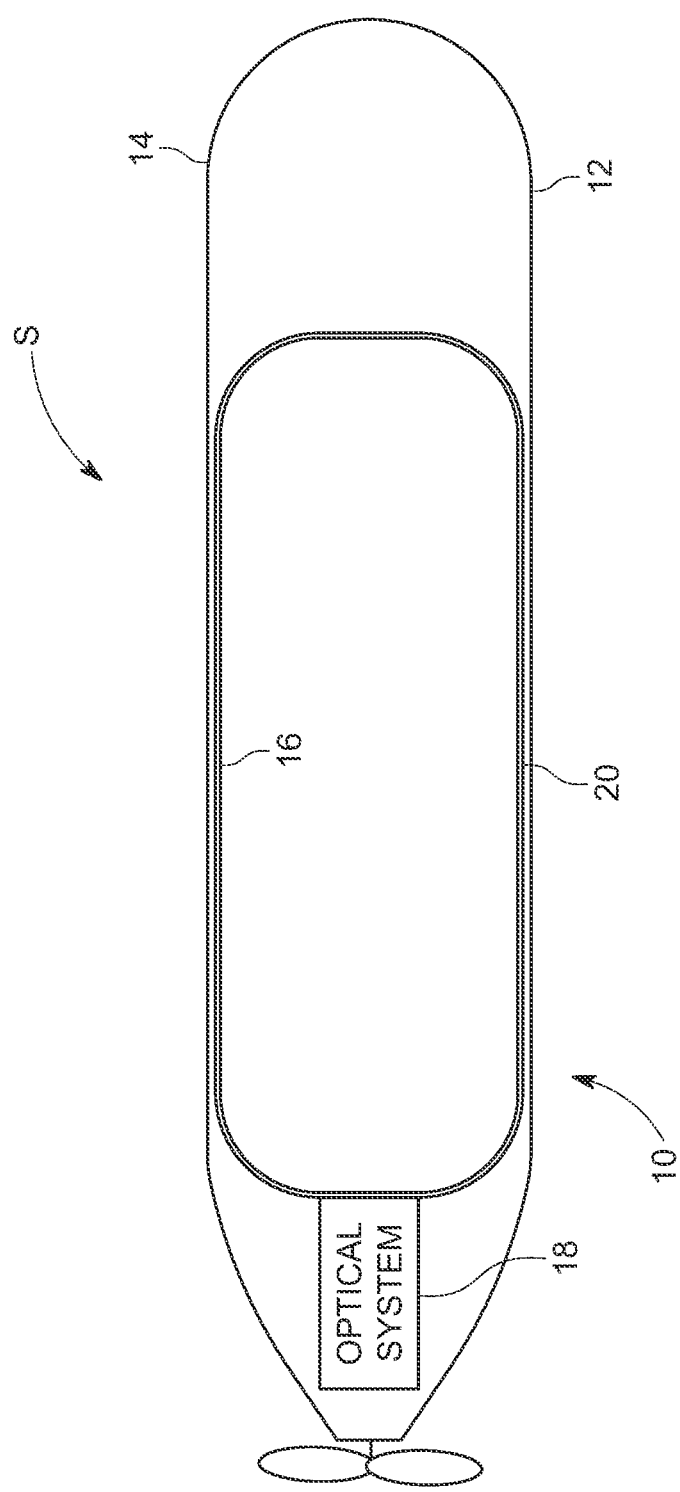

VEHICLE HULL WITH INTERFEROMETRIC FIBER-OPTIC GYROSCOPE

BACKGROUND OF THE INVENTION

Field of the Invention

The disclosure of the present patent application relates to the gyroscopic measurement of rotation, and particularly to a vehicle hull with an interferometric fiber-optic gyroscope (I-FOG) incorporated into the hull.

Description of Related Art

An interferometric fiber-optic gyroscope (I-FOG) senses changes in orientation using the Sagnac effect, producing the same output as a mechanical gyroscope but with no moving parts and with much greater precision. The I-FOG determines angular/rotational orientation based on the interference of light passing through a coil of optical fiber. FIG. 2 illustrates a typical I-FOG 100, which uses a light source 112 to produce a light beam which is transmitted through an optical coupler 114 to an optical modulator 116. The optical coupler 114 and the optical modulator 116 are typically optically coupled by optical fibers. The light source 112 is typically a laser, a laser diode or a super-luminescent diode producing amplified spontaneous emission. A fiber optic coil 118 is optically coupled at each of its ends to optical modulator 116. The optical modulator 116 divides the light beam into two counter-propagating beams, represented in FIG. 2 by clockwise beam CW and counter-clockwise beam CCW. Each of the counter-propagating beams CW, CCW circulates completely around fiber optic coil 118 and back into the optical modulator 116. The optical modulator 116 recombines the two counter-propagating beams CW, CCW, which then propagate back through optical coupler 114 and into a photodetector 120. Photodetector 120 is optically coupled to optical coupler 114 by an optical fiber or the like and intercepts the recombined beams.

The optical modulator 116 is an integrated optical device that both divides the initial light beam into the two counter-propagating beams CW and CCW and also controls the relative phase between the two counter-propagating beams CW and CCW. A modulator control voltage $V_M$ is supplied to the optical modulator 116 to control the relative phase change applied to the beams CW, CCW as they transit in both directions through an optically non-linear crystal in the modulator.

Photodetector 120 may be a photodiode, for example, having a semiconductor material as the photosensitive element. The photodetector 120 generates a signal in the form of a photodetector voltage $V_D$ that is proportional to the optical power of the recombined beams interfering on the photodetector 120. The photodetector voltage $V_D$ is received by a controller 122, which sets the modulator voltage $V_M$ and provides an output that is a calibrated or uncalibrated rotation rate of the I-FOG 100.

In a ring interferometer, when the interferometer is at rest with respect to a nonrotating frame, the light takes the same amount of time to traverse the ring in either direction. However, when the interferometer system is spun, one beam of light has a longer path to travel than the other in order to complete one circuit of the ring, thus taking longer, which results in a phase difference between the two beams. In an I-FOG, such as I-FOG 100 described above, one of the clockwise beam CW and the counter-clockwise beam CCW will take longer to traverse the fiber optic coil 118 when the I-FOG 100 is rotated. This is an example of the well-known Sagnac effect. The time delay of one of the beams results in a phase difference between the clockwise beam CW and the counter-clockwise beam CCW, and photodetector 120 measures this phase difference, with controller 122 converting the phase difference into a resulting measured rotation rate using the well-known Sagnac relation $$\phi_S = \frac{8\pi A N \Omega_p}{\lambda c},$$

where $\phi_S$ is the measured Sagnac phase shift, A is the area enclosed by the optical path, N is the number of turns of the fiber optic coil, $\lambda$ is the wavelength of the light beam, c is the speed of light, and $\Omega_p$ is the component of the angular velocity perpendicular to the plane of the optical path. For exemplary I-FOG 100 shown in FIG. 2, the fiber optic coil 118 is circular, thus $A=\pi R^2$, where R is the radius of the fiber optic coil. Thus, based on the measured $\phi_S$, controller 122 can easily calculate the angular velocity component $\Omega_p$. For exemplary I-FOG 100 shown in FIG. 2, $\Omega_p$ represents the angular velocity of I-FOG 100 measured in the direction which is perpendicular to each loop of the coil 118; i.e., in the direction along the axis of coil 118 or, in the orientation of FIG. 2, out of the page.

Since the Sagnac shift is dependent on the area of each loop of the fiber optic coil, the Sagnac shift is also dependent on the length of each individual loop, with a larger loop resulting in a larger Sagnac shift. The Sagnac shift is also dependent on the number of individual loops in the coil. Since a larger phase shift is easier to detect, I-FOGs commonly have overall fiber lengths between ⅓ of a kilometer and five kilometers. However, since the most common application of an I-FOG is detecting rotation within a vehicle, a typical I-FOG is miniaturized, having a coil diameter as small as 50 mm and a coil height as small as 25 mm. For a relatively short optical fiber of ⅓ of a kilometer, over 2,000 individual loops must be used in such a small gyroscope.

One source of error in I-FOGs is "gyro drift", which results from a difference in polarization between the clockwise and counter-clockwise light beams. Although both light beams enter the optical fiber optic coil with the same polarization, microbends (i.e., microscopic kinks and bends in the optical fiber) can change the polarization direction. For very large loops of optical fiber, where the curvature of the fiber is relatively smooth and gentle, such microbends are minimized. However, in a typical I-FOG, such as described in the above example, where 2,000 loops of optical fiber are packed into a coil with a height of approximately 25 mm and a radius of approximately 25 mm, the possibility of gyro drift due to microbends becomes highly likely. Cross-coupling between loops which are packed so close together can also create a similar gyro drift effect. The solutions to this issue involve a) accurately randomizing the polarization, which results in loss of sensitivity in the gyroscope; b) using a strongly birefringent fiber, which greatly increases the cost of the gyroscope; or c) developing a method of winding the coil so that there are no defects, such as kinks, to disturb the polarization or to cause cross-coupling. The latter requires an extremely careful, complicated, slow and expensive winding method. Thus, miniaturizing an I-FOG carries inherent problems and difficulties, particularly with regard to the cost and labor involved in manufacture.

Although shortening the length of the optical fiber to decrease the number of loops in the coil seems like an obvious solution to the above problems, the length of the optical fiber cannot be decreased without losing sensitivity of the gyroscope. The fundamental limit (i.e., the noise "floor") of the I-FOG is the photon shot noise. The minimum detectable rotation rate (i.e., the sensitivity threshold) of the I-FOG is given by $$\Delta \Omega = \frac{2}{K_0 \sqrt{n_{ph} \eta t}},$$

where $n_{ph}$ is the number of photons falling on the photodetector, $\eta$ is the photodetector's quantum efficiency, t is the averaging time for the measurement, and $K_0$ is a scale factor which is directly proportional to the length of the optical fiber. Thus, as the length of the optical fiber decreases, the minimum detectable rotation rate increases and the gyroscope loses sensitivity. Ultimately, this result explains why I-FOGs typically have optical fiber lengths which are measured in kilometers.

In order to overcome the issues inherent in miniaturized I-FOGs, such as those discussed above, it would be desirable to be able to take advantage of the properties and parameters of the vehicle itself to allow for a long optical fiber length without requiring the fiber optic coil to be compressed into a very small space. For example, FIG. 3 illustrates a typical submarine S which, as is well-known in the art, has a two-part hull 128 composed of an outer hull 130 (commonly referred to as the "light hull") and an inner hull 132 (commonly referred to as the "pressure hull"). The outer hull 130 is the outer non-watertight hull which provides a hydrodynamically efficient shape. The inner hull 132 is located within the outer hull 130 and maintains structural integrity with the difference between external and internal pressure at depth. Such dual hulls are common because outer hull 130 can be used to mount equipment which, if attached directly to the inner hull 132, could cause unnecessary stress. The dual hull design also saves space inside the inner hull 132 because ring stiffeners, longitudinals and other structural components are commonly located in the space between the two hulls. These measures help minimize the size of the pressure hull, which is much heavier than the light hull. Further, in case the submarine is damaged, the outer hull 130 can take some of the damage without compromising the submarine's integrity as long as the inner hull 132 remains intact.

With regard to exemplary dimensions of submarine S, the United States Navy's Ohio-class submarine, for example, has a length of 170 m and a diameter of 13 m. The hull of such a submarine provides ample space for winding a kilometer-scale fiber optic coil without concerns for microbends and cross-coupling in the fiber. Thus, a vehicle hull with an interferometric fiber-optic gyroscope solving the aforementioned problems is desired.

SUMMARY OF THE INVENTION

The vehicle hull with an interferometric fiber-optic gyroscope includes an outer hull, an inner hull arranged within the outer hull, and an interferometric fiber-optic gyroscope. A fiber optic coil of the interferometric fiber-optic gyroscope is wound around the inner hull in a space between the inner hull and the outer hull. As a non-limiting example, the vehicle may be a dual-hull submarine, and the fiber optic coil may be would around the pressure hull of the submarine within the space between the pressure hull and the light hull. Other than the arrangement of the fiber optic coil around the inner hull, the interferometric fiber-optic gyroscope may be a conventional interferometric fiber-optic gyroscope, such as that described above.

These and other features of the present subject matter will become readily apparent upon further review of the following specification.

BRIEF DESCRIPTION OF DRAWINGS

FIG. 1B diagrammatically illustrates the vehicle hull with an interferometric fiber-optic gyroscope, shown in top view.

Similar reference characters denote corresponding features consistently throughout the attached drawings.

DETAILED DESCRIPTION

Figure 1A:
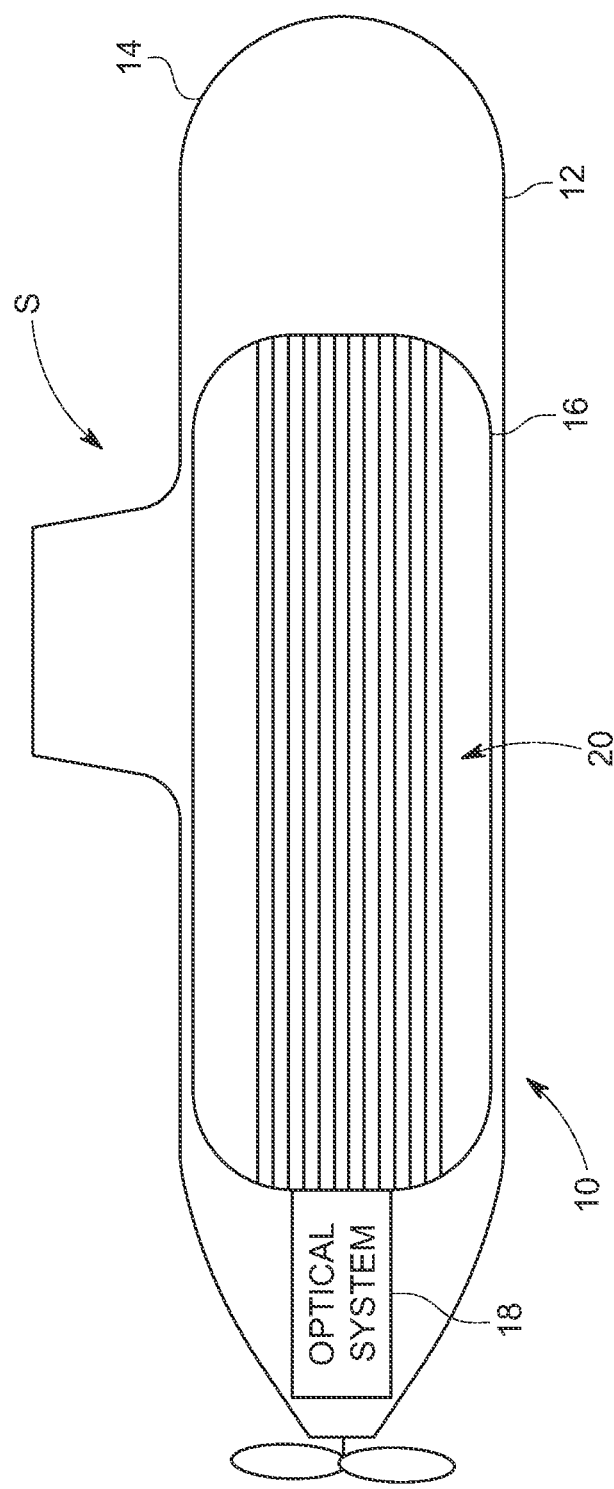
FIG. 1A diagrammatically illustrates a vehicle hull with an interferometric fiber-optic gyroscope, shown in side view.

As shown in FIGS. 1A and 1B, the vehicle hull with an interferometric fiber-optic gyroscope 10 includes a dual hull 12 formed from an outer hull 14 and an inner hull 16 which is arranged within the outer hull 14. In the non-limiting example shown in FIGS. 1A and 1B, outer hull 14 is the light hull of a submarine S, and inner hull 16 is the pressure hull of the submarine S. However, it should be understood that the vehicle hull with an interferometric fiber-optic gyroscope 10 may be used with any type of vehicle having an inner hull and an outer hull, including, but not limited to, submarines, aircraft, spacecraft, space stations, drones, satellites, boats and ships, tankers, unmanned aerial vehicles and unmanned underwater vehicles.

Figure 2:
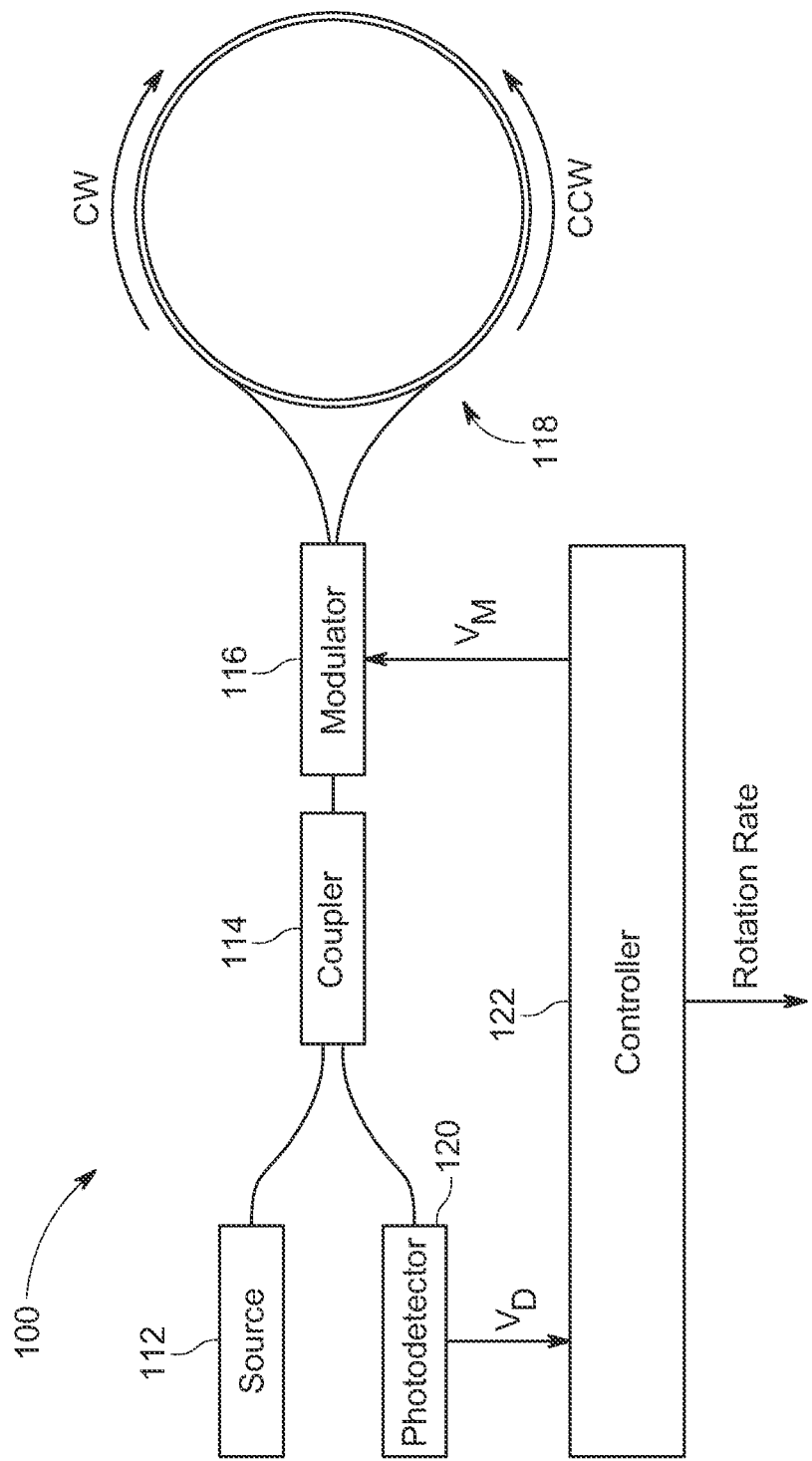
FIG. 2 schematically illustrates a conventional interferometric fiber-optic gyroscope.
Figure 3:
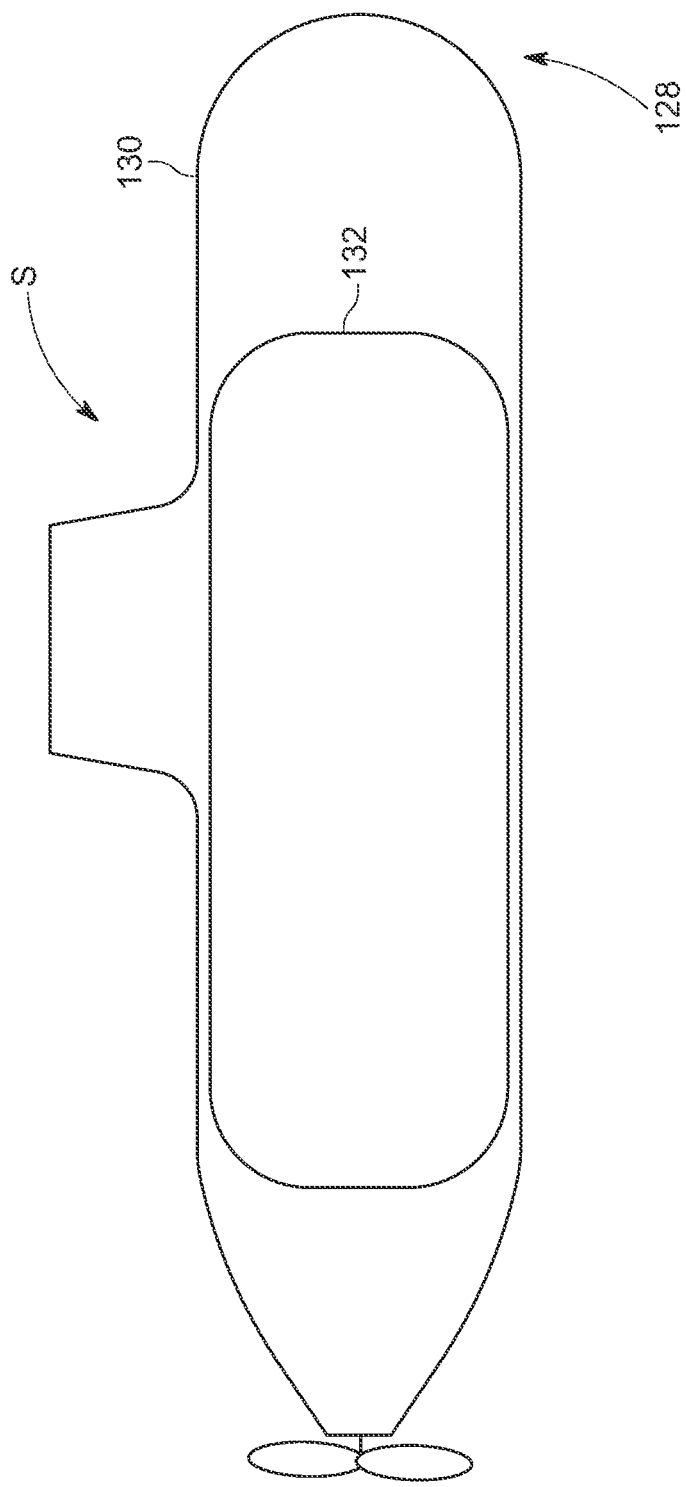
FIG. 3 diagrammatically illustrates a conventional dual hull submarine.
Figure 4:
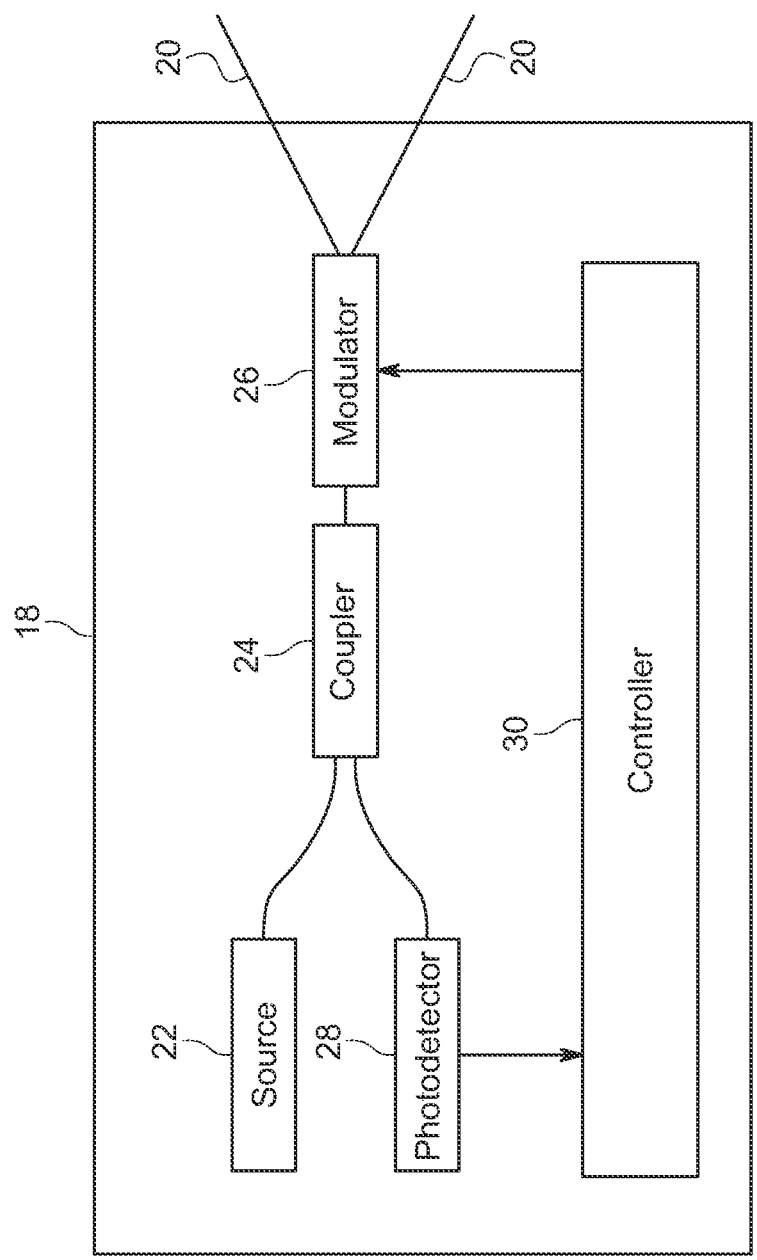
FIG. 4 diagrammatically illustrates an optical system of the vehicle hull with an interferometric fiber-optic gyroscope.

The vehicle hull with an interferometric fiber-optic gyroscope 10 also includes an interferometric fiber-optic gyroscope with an optical system 18 and a fiber optic coil 20. As shown in FIGS. 1A and 1B, the fiber optic coil 20 is wound around the inner hull 16 in the space between the inner hull 16 and the outer hull 14. It should be understood that the interferometric fiber-optic gyroscope may be any suitable type of interferometric fiber-optic gyroscope, ring gyroscope or the like, such as, for example, that discussed above with regard to FIG. 2. As a non-limiting example, as shown in FIG. 4, the optical system 18 optically coupled to the fiber optic coil 20 wound around the inner hull 16 may include a light source 22 for producing a light beam which may be transmitted through an optical coupler 24 to an optical modulator 26. The optical coupler 24 and the optical modulator 26 may be optically coupled by optical fibers or the like. It should be understood that any suitable type of light source may be used, such as, but not limited to, a laser, a laser diode or a super-luminescent diode producing amplified spontaneous emission. It should be understood that any suitable type of optical coupler and optical modulator may be used, as are well-known in the art. It should be further understood that the relative dimensions of fiber optic coil 20 have been greatly exaggerated in FIG. 1A for purposes of illustration and clarity, specifically to easily show the optical fiber wound about inner hull 16. In practice, optical fibers of the type used in interferometric fiber-optic gyroscopes have core diameters measured in micrometers and the individual loops of the coil are typically wound to be adjacent and contiguous with one another, neither of which factors could be realistically illustrated without losing detail.

The fiber optic coil 20 is optically coupled at each of its ends to optical modulator 26. The optical modulator 26 divides the light beam into two counter-propagating beams, and each of the counter-propagating beams circulates completely around fiber optic coil 20 and back into the optical modulator 26. The optical modulator 26 recombines the two counter-propagating beams, which then propagate back through optical coupler 24 and into a photodetector 28. Photodetector 28 may be optically coupled to optical coupler 24 by an optical fiber or the like and intercepts the recombined beams.

The optical modulator 26 is an integrated optical device that both divides the initial light beam into the two counter-propagating beams and also controls the relative phase between the two counter-propagating beams under the control of a controller 30. A modulator control voltage $V_M$ is supplied to the optical modulator 26 by controller 30 in order to control the relative phase change applied to the counter-propagating beams as they transit in both directions through an optically non-linear crystal in the optical modulator. 26. It should be understood that any suitable type of controller may be used, including, but not limited to, a computer, a processor, a programmable logic controller, control circuitry or the like.

It should be understood that any suitable type of photodetector may be used. As a non-limiting example, photodetector 28 may be a photodiode having a semiconductor material as the photosensitive element. The photodetector 28 generates a signal in the form of a photodetector voltage $V_D$ that is proportional to the optical power of the recombined beams interfering on the photodetector 28. The photodetector voltage $V_D$ is received by the controller 30, which sets the modulator voltage $V_M$ and provides an output that is a calibrated or uncalibrated rotation rate of the fiber optic coil 20.

As described above with regard to FIG. 2, one of the clockwise beam and the counter-clockwise beam will take longer to traverse the fiber optic coil 20 when the fiber optic coil 20 is rotated. The time delay of one of the beams results in a phase difference between the clockwise beam and the counter-clockwise beam, and photodetector 28 measures this phase difference, with controller 30 converting the phase difference into a resulting measured rotation rate using the well-known Sagnac relation $$\phi_S = \frac{8\pi A N \Omega_p}{\lambda c},$$

where $\phi_S$ is the measured Sagnac phase shift, A is the area enclosed by the optical path, N is the number of turns of the fiber optic coil, $\lambda$ is the wavelength of the light beam, c is the speed of light, and $\Omega_p$ is the component of the angular velocity perpendicular to the plane of the optical path. For the fiber optic coil 20, the area A is the cross-sectional area of the inner hull 16. Based on the measured $\phi_S$, controller 30 calculates the angular velocity component $\Omega_p$ using the above relation. This determined angular velocity may then be output using any suitable type of interface, such as a touchscreen or the like, which is in communication with controller 30. The vehicle hull with an interferometric fiber-optic gyroscope 10 may be used in a manner similar to any vehicle equipped with a gyroscope; i.e., for measuring or maintaining orientation and/or angular velocity of the vehicle.

It is to be understood that the vehicle hull with an interferometric fiber-optic gyroscope is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A vehicle hull with an interferometric fiber-optic gyroscope, comprising:
   an outer hull;
   an inner hull arranged within the outer hull; and
   an interferometric fiber-optic gyroscope, wherein a fiber optic coil of the interferometric fiber-optic gyroscope is wound around the inner hull in a space between the inner hull and the outer hull.

2. The vehicle hull with an interferometric fiber-optic gyroscope as recited in claim 1, wherein the outer hull comprises a light hull of a submarine, and the inner hull comprises a pressure hull of the submarine.

3. The vehicle hull with an interferometric fiber-optic gyroscope as recited in claim 1, wherein the interferometric fiber-optic gyroscope further comprises:
   a light source for producing an initial light beam;
   an optical modulator in optical communication with the light source, the fiber optic coil being optically coupled at two ends thereof to the optical modulator, the optical modulator dividing the initial light beam into two counter-propagating beams in the fiber optic coil; and
   a photodetector optically coupled with the optical modulator for receiving a recombined light beam produced by the optical modulator.

4. The vehicle hull with an interferometric fiber-optic gyroscope as recited in claim 3, wherein the interferometric fiber-optic gyroscope further comprises an optical coupler for optically coupling the light source and the optical modulator.

5. The vehicle hull with an interferometric fiber-optic gyroscope as recited in claim 4, wherein the optical coupler further optically couples the photodetector and the optical modulator.

6. A submarine hull with an interferometric fiber-optic gyroscope, comprising:
   an outer hull;
   an inner hull arranged within the outer hull; and
   an interferometric fiber-optic gyroscope, wherein a fiber optic coil of the interferometric fiber-optic gyroscope is wound around the inner hull in a space between the inner hull and the outer hull.

7. The submarine hull with an interferometric fiber-optic gyroscope as recited in claim 6, wherein the interferometric fiber-optic gyroscope further comprises:
   a light source for producing an initial light beam;
   an optical modulator in optical communication with the light source, the fiber optic coil being optically coupled at two ends thereof to the optical modulator, the optical modulator dividing the initial light beam into two counter-propagating beams in the fiber optic coil; and
   a photodetector optically coupled with the optical modulator for receiving a recombined light beam produced by the optical modulator.

8. The submarine hull with an interferometric fiber-optic gyroscope as recited in claim 7, wherein the interferometric fiber-optic gyroscope further comprises an optical coupler for optically coupling the light source and the optical modulator.

9. The submarine hull with an interferometric fiber-optic gyroscope as recited in claim 8, wherein the optical coupler further optically couples the photodetector and the optical modulator.

\* \* \* \* \*